Figure 1:
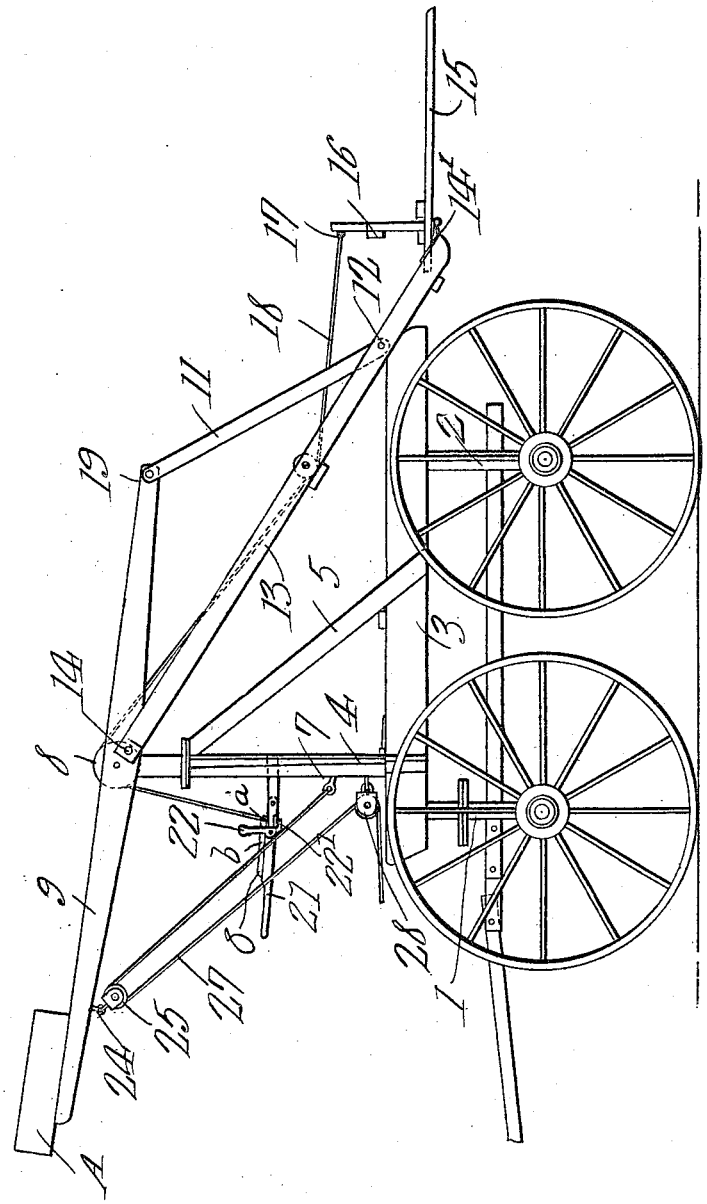

J. R. WRIGHT.
SWINGING STACKER.
APPLICATION FILED JUNE 17, 1911.

1,045,765.

Patented Nov. 26, 1912.
2 SHEETS—SHEET 1.

Witnesses

J. R. Wright,
Inventor
by
Attorneys

J. R. WRIGHT.
SWINGING STACKER.
APPLICATION FILED JUNE 17, 1911.
1,045,765.
Patented Nov. 26, 1912.
2 SHEETS—SHEET 2.
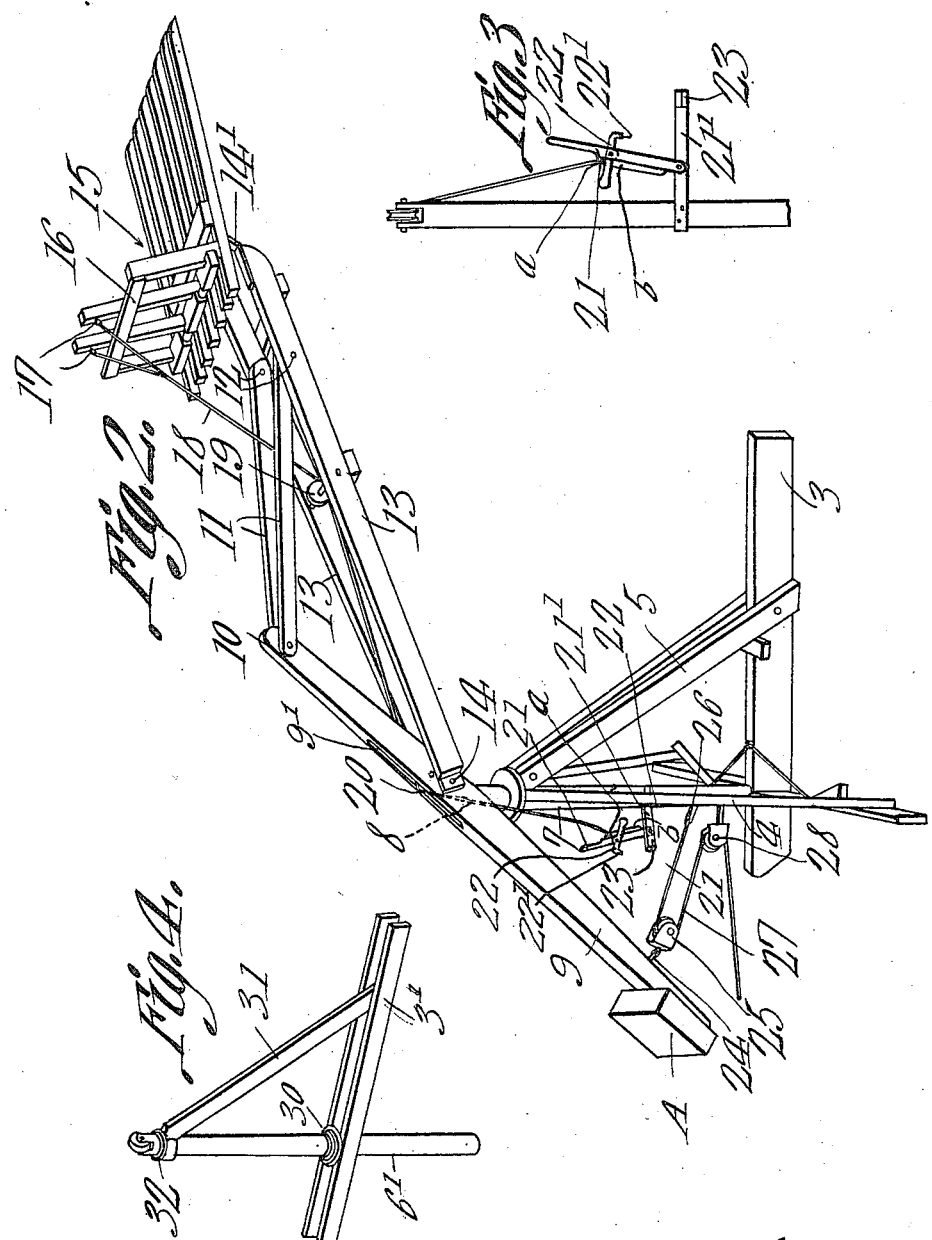
Witnesses
J. R. Wright,
Inventor
by
Attorneys

UNITED STATES PATENT OFFICE.

JOHN R. WRIGHT, OF WHEELING, MISSOURI, ASSIGNOR TO WRIGHT RAKE AND STACKER COMPANY, OF WHEELING, MISSOURI.

SWINGING STACKER.

1,045,765.   Specification of Letters Patent.   Patented Nov. 26, 1912.

Application filed June 17, 1911.  Serial No. 633,743.

*To all whom it may concern:*

Be it known that I, JOHN R. WRIGHT, a citizen of the United States, residing at Wheeling, in the county of Livingston and State of Missouri, have invented a new and useful Swinging Stacker, of which the following is a specification.

This invention relates to improvements in stackers, the primary object of the invention being the provision of a stacker attachment adapted to be attached to any form of farm wagon, and provided with a pivotal member and means for moving the stacker fork about the pivot, and with means for elevating the fork and operating it individually to retain a load or dump it.

A further object of the invention is the provision of a stacker having a swinging member capable of being moved vertically up and down and carrying at its end a pivoted fork, combined with a pivotal support for the swinging member whereby the entire swinging member and fork may be moved in a circle or segment of a circle.

With the foregoing and other objects in view which will appear as the description proceeds, the invention resides in the combination and arrangement of parts and in the details of construction hereinafter described and claimed, it being understood that changes in the precise embodiment of invention can be made within the scope of what is claimed without departing from the spirit of the invention.

In the drawings—Figure 1 is a side elevation of a wagon with the stacker attachment applied thereto. Fig. 2 is a perspective view of the stacker alone with its fork in elevated position. Fig. 3 is a detail view of the means of operating the stacker on its pivot and elevating the same. Fig. 4 is a detail view of a modified form of supporting post.

Referring to the drawings, 1 and 2 designate the front and rear bolsters of a wagon, to which is detachably secured the base 3 of the stacker attachment. This stacker attachment has the inclined braces 4 and 5, arranged in pairs and secured to the base 3, so that the collar 6, carried by the said braces 4 and 5, at their apex or upper end, will pivotally support the cylindrical standard or post 7, of the stacker.

Pivoted at 8, to the upper end of the post 7, and so as to have a vertical swinging movement, is a main supporting and actuating lever 9, which is slotted as at 9', intermediate of its ends and has its forward end at 10, bolted to the rear ends of the two links 11 whose forward ends are pivotally secured at 12 to the respective members of the arm 13. The members of the arm 13, are bolted at 14 to the lever 9, and have hingedly secured as at 14', at their outer ends, the hay fork or carrier frame 15, provided with the right-angled strips 16, which assist in forming a receptacle in the fork.

By hingedly connecting the fork as at 14, it is evident that the said fork may be given a tilting movement, and that when the arm 13 is lowered, it is desirable to have the outer end of the fork tilted upwardly to form a receptacle for the hay or straw, and that after the arm 13 has been raised, that the fork may be tilted downwardly to release the hay or straw from the fork. This is accomplished by means of the eyes 17, and the flexible connection, such as a cable or chain 18, which has its outer ends forked or connected to said eyes 17, while it is passed backwardly around the pulley 19, journaled between the members of the arm 13, and over the pulley 20, journaled in the rear portion of the slot 9', of the main lever 9, the inner terminal of the connection 18, being connected to the ring $a$, slidably mounted upon the wire guide $b$, mounted upon the upper face of the operating lever 21, which lever is pivoted to the frame or arm 21', and operably disposed to be pulled downwardly to elevate the carrier 14, and engage the catch 23, at the end of the frame 21' and thus lock the cable 18 to hold the fork in the elevated and hay holding position as clearly shown in Fig. 2. The controlling lever 21 for the manipulation of the cable 18 and fork 15, when in the lower locked position, as shown in Fig. 2, provides a means whereby the fork and the carrying frame may be rotated to convey the frame from loading position to stackforming and unloading position, the handle 22 of the hook 22' being pushed inwardly to release the hook 22' from the catch 23 to permit the cable 18 to be slackened and the fork dumped. Thus the handle 21, not only acts as a fork tilting means, but as a means to rotate the stacker.

In order to actuate the arm 13, to raise and lower the fork 15, and carry the same bodily to an elevated or to a lowered position, and vice versa, a pulley sheave 25 is connected as at 24 to the lower end of the lever 9, the flexible connection 27, such as a cable, rope or chain, having its inner end connected as at 26, passing through the sheave 25, and sheave 28, so that its free end may be pulled upon to lower the inner end of the lever 9, and consequently lift or elevate the outer end of the member 13, and the fork 15. When it is desired to lower the fork, the connection 27 is gradually released, permitting the weight of the fork 15 to lower the outer end of the arm 13.

As shown in Fig. 4, the base 3', has two parallel plates, between which is mounted the post 6', its collar 30 permitting it to be rotated, the single brace 31, being mounted to the base 3' and carrying the collar 32, for rotatably supporting the upper end of the post 6'.

From the foregoing description taken in connection with the drawings, it is evident that a swinging stacker attachment, which is readily attachable to and detachable from an ordinary farm wagon is provided, said stacker being so constructed as to permit the fork to be loaded, raised to the desired elevation, and delivered by swinging the complete stacker upon its axis until the fork is above the point of discharge, at which time, the fork is tilted and unloaded.

What is claimed is—

1. A stacker, having a base, a rotatable post journaled vertically thereto, a vertically swinging stacker frame pivoted to the upper end of said post, a vertically tilting fork carried in the outer end of said frame, another frame connected to the post intermediate its ends and projecting from the opposite side to the fork, a post rotating and the fork actuating lever having its inner end pivoted intermediately of said last mentioned frame, a catch carried by the outer end of said last mentioned frame, a locking hook pivoted to said lever and disposed, when the lever is depressed, to engage the catch and lock the fork in elevated position, a flexible connection connected to the fork at one end, a ring connected at the other end, and a metal guide carried by the lever having said ring slidably mounted thereon.

2. A stacker, having a base, a series of standards carried thereby, a collar supported by the standards and forming an upper vertical journal, a post rotatably mounted in the base and collar, a frame connected to the post intermediate of its ends and extending from one side thereof, a lever having one end pivoted to said frame intermediate of the ends of the frame, the end of the frame being a catch, a hook pivoted to said lever and disposed to engage the catch of the frame and hold the lever in depressed position, a main supporting and actuating double lever pivotally mounted in the upper end of the post, means for vertically swinging the same, an arm having its inner terminal pivoted to the double lever near the post, a link connection between the outer end of the double lever and the arm, a fork pivotally mounted in the free end of the arm, a flexible connection between the fork and extending through the arm and over the upper end of the post, a guide connected to and carried by the first lever, and a sliding connection between the free end of the flexible connection and said guide, whereby said first mentioned lever controls the actuation of the fork and the rotation of the post.

In testimony that I claim the foregoing as my own, I have hereto affixed my signature in the presence of two witnesses.

JOHN R. WRIGHT.

Witnesses:
B. H. BRIGHT,
C. M. DE WITT.